United States Patent
Robinson

(10) Patent No.: US 7,668,042 B2
(45) Date of Patent: Feb. 23, 2010

(54) METHOD FOR OBTAINING A SEISMIC WAVELET USING SEISMIC DATA AND WELL LOGS IN A DEVIATED WELL

(75) Inventor: Gary Charles Robinson, Aurora, CO (US)

(73) Assignee: Prism Seismic Inc., Centennial, CO (US)

( * ) Notice: Subject to any disclaimer, the term of this patent is extended or adjusted under 35 U.S.C. 154(b) by 291 days.

(21) Appl. No.: 11/484,234

(22) Filed: Jul. 10, 2006

(65) Prior Publication Data

US 2007/0064529 A1 Mar. 22, 2007

Related U.S. Application Data

(60) Provisional application No. 60/715,913, filed on Sep. 9, 2005.

(51) Int. Cl.
*G01V 1/40* (2006.01)
(52) U.S. Cl. .............................. 367/25; 367/27; 367/33
(58) Field of Classification Search .................. 367/25, 367/27, 31, 32, 33, 57, 73
See application file for complete search history.

(56) References Cited

U.S. PATENT DOCUMENTS

| | | | | |
|---|---|---|---|---|
| 5,884,229 | A * | 3/1999 | Matteucci | 702/14 |
| 6,665,615 | B2 * | 12/2003 | Van Riel et al. | 702/2 |
| 6,856,910 | B2 * | 2/2005 | Goswami et al. | 702/10 |
| 6,941,228 | B2 * | 9/2005 | Toelle | 702/17 |
| 2002/0013661 | A1 * | 1/2002 | Van Riel et al. | 702/2 |
| 2004/0064294 | A1 * | 4/2004 | Van Riel et al. | 702/189 |
| 2005/0162974 | A1 * | 7/2005 | Milkereit et al. | 367/57 |

OTHER PUBLICATIONS

Badachhape, et al. "Alpine Field Simultaneous Angle Dependent Inversion." Offshore Technology Conference, 2004.*
Arild Buland and Henning Omre, Bayesian wavelet estimation from seismic and well data, Geophysics, Nov.-Dec. 2003, pp. 2000-2009, vol. 68, No. 6.
Larry R. Lines and Sven Treitel, Wavelets, well logs and Wiener filters, First Break, Aug. 1985, pp. 9-14, vol. 3, No. 8.
A. T. Walden, Wavelet Estimation Using the Multitaper Method, Geophysical Prospecting 39, 1991, pp. 625-642.
P. Bois et al., Sismogrammes Synthetiques; Possibilities, Techniques de Realisation et Limitations, Geophysical Prospecting 8, 1960, pp. 260-314.
A.T. Walden and R.E. White, On Errors of Fit and Accuracy in Matching Synthetic Seismograms and Seismic Traces, Geophysical Prospecting 32, 1984, pp. 871-891.
Roy White, The accuracy of well ties: practical procedures and examples, pp. 816-819.
A. T. Dennison, An Introduction to Synthetic Seismogram Techniques, Symposium on Synthetic Seismograms, Dec. 9-11, 1959, pp. 231-241.
N. A. Anstey, Attacking the Problems of the Synthetic Seismogram, Geophysical Prospecting VIII, pp. 242-259.

* cited by examiner

*Primary Examiner*—Scott A Hughes
(74) *Attorney, Agent, or Firm*—Dorr, Carson & Birney, P.C.

(57) ABSTRACT

A method for obtaining a seismic wavelet using seismic data in a deviated well includes the steps of: (a) extracting seismic data along the well path; (b) calculating the well path in the time domain; (c) extracting a window of seismic data in the time domain along the well path in the time domain; (d) combining the extracted window of seismic data to obtain a composite seismic trace; and (e) extracting a seismic wavelet using the composite seismic trace.

14 Claims, 5 Drawing Sheets

US 7,668,042 B2

METHOD FOR OBTAINING A SEISMIC WAVELET USING SEISMIC DATA AND WELL LOGS IN A DEVIATED WELL

RELATED APPLICATION

The present application is based on and claims priority to the Applicant's U.S. Provisional Patent Application 60/715,913, entitled "Method for Obtaining a Seismic Wavelet Using Seismic Data and Well Logs in a Deviated Well," filed on Sep. 9, 2005.

BACKGROUND OF THE INVENTION

Field of the Invention

The present invention relates generally to the field of geophysics. More specifically, the present invention discloses a method for obtaining a seismic wavelet using seismic data and well logs in a deviated well.

Statement of the Problem. Extracting a seismic wavelet from seismic data using a seismic trace and corresponding sonic and density information from a vertical well located near the seismic trace is a common procedure in geophysical exploration. Extracting a seismic wavelet from seismic data using sonic and density information from a deviated well is problematic, particularly if the horizontal component of the well deviation is significantly greater than the inter-trace distance of the seismic data.

Seismic data are often used to obtain information on the structure and physical attributes of the subsurface. Log data recorded in wells are also used to obtain information on the structure and physical attributes of the subsurface. However, seismic data are recorded in time, whereas log data are recorded in depth. In order to synthesize the two datasets, the geophysicist must somehow calibrate the data in time with the data in depth. One method for obtaining this calibration is to generate a synthetic seismogram from the sonic and density log data obtained in the well. This involves convolving the reflection coefficient time series generated from the sonic and density log data with an appropriate wavelet. Numerous theoretical formulations for wavelets exist, but it is preferable to use the well data to deterministically compute a wavelet from the seismic data. The extracted wavelet can be used in further wavelet processing of the seismic data, in addition to providing a more accurate synthetic seismogram than can be obtained from a theoretical wavelet. This is a routine procedure if the well data are obtained from a vertical or near vertical well (i.e., the horizontal deviation is small compared to the seismic inter-trace distance).

In contrast, extracting a wavelet from seismic data using information from a deviated well poses a significant challenge, as the well path may cross a significant number of seismic traces, with only a small number of seismic samples on each trace located in the vicinity of the well bore. As the vast majority of offshore wells are deviated, and an increasing percentage of onshore wells are also deviated, a significant quantity of well information is unavailable to the geophysicist for use in accurate well-seismic calibration if deviated well information cannot be used to extract seismic wavelets.

Solution to the Problem. The present invention provides a method for combining seismic traces along the trajectory of a deviated well to generate a single seismic trace or a set of seismic traces which can then be utilized with the sonic and density log information in the deviated well to extract a seismic wavelet.

SUMMARY OF THE INVENTION

This invention provides a method for obtaining a seismic wavelet using seismic data and well logs in a deviated well. This is done by: (a) extracting seismic data along the well path; (b) calculating the well path in the time domain; (c) extracting a window of seismic data in the time domain along the well path in the time domain; (d) combining the extracted window of seismic data to obtain a composite seismic trace; and (e) extracting a seismic wavelet using the composite seismic trace.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
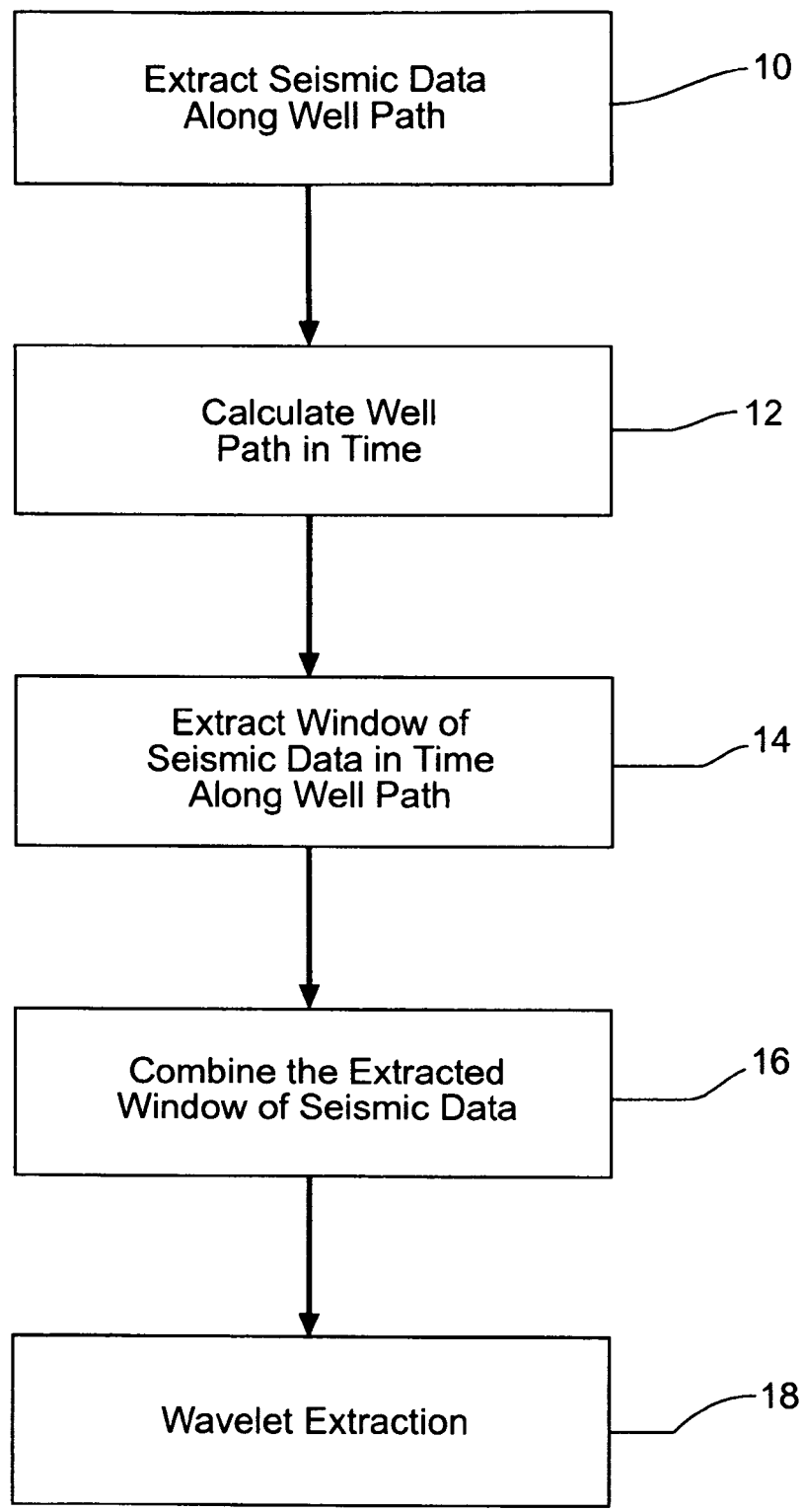
FIG. 1 is a flowchart of the present methodology.

Turning to FIG. 1, a flowchart is provided showing the major steps of the present methodology. The steps can be summarized as:

Extract seismic data along the well path (step 10)

Calculate the well path in time (step 12)

Extract a window of seismic data (2D or 3D) in time around the well path in time (step 14)

Combine the extracted window of seismic data, taking dip into account if necessary (step 16)

Perform wavelet extraction using the resulting seismic trace and the well data (step 18)

Extraction of Seismic Data Along and Adjacent to the Well Path. The initial step, once all the necessary data (seismic data, well logs, well deviation) have been loaded, is to compute the horizontal (x-y coordinates) and vertical (true vertical depth) components of the well path. Using the x-y coordinates of the horizontal component of the well path, along with the x-y coordinates of the seismic traces, one can extract from the seismic data (2D or 3D) the set of traces along the well path or closest to the well path, as well as seismic traces adjacent to the well path (e.g., for use in building a 3D cylinder of seismic data around the well path).

Seismic traces are selected by determining the seismic bins that are intersected by the horizontal component of the well path, and then extracting from the seismic dataset the seismic traces located within those selected bins. For the 3D case, traces adjacent to those intersected by the well path are also extracted in order to form a 3D dataset around the well path. For a 2D seismic dataset (i.e., a collection of 2D seismic lines), seismic traces are selected by determining those traces that lie within a user-selected horizontal distance from the horizontal component of the well path.

Calculate Well Path in Time. The vertical component of the well path obtained from the well deviation information is in units of depth (e.g., feet or meters). These depths must be converted to time in order to determine the intersection of the well path with the seismic data, as the vertical axis of the seismic data is normally time (milliseconds or seconds), unless the seismic data have been depth-converted or depth-migrated.

A velocity function or a time-depth function is used to convert depths to times. This velocity or time-depth information can be obtained from checkshots obtained in the well or a nearby well, from a time-depth or velocity function obtained from a nearby vertical well that has been correlated with the seismic data, from integration of the TVD sonic log (travel-time measurements of the sonic log corrected for deviation) in the deviated well along with an assumption of the average velocity to the start depth of the log, from seismic velocity information, or from a deterministic velocity/slowness function, such as $v=v_0+kz$.

Figure 2:
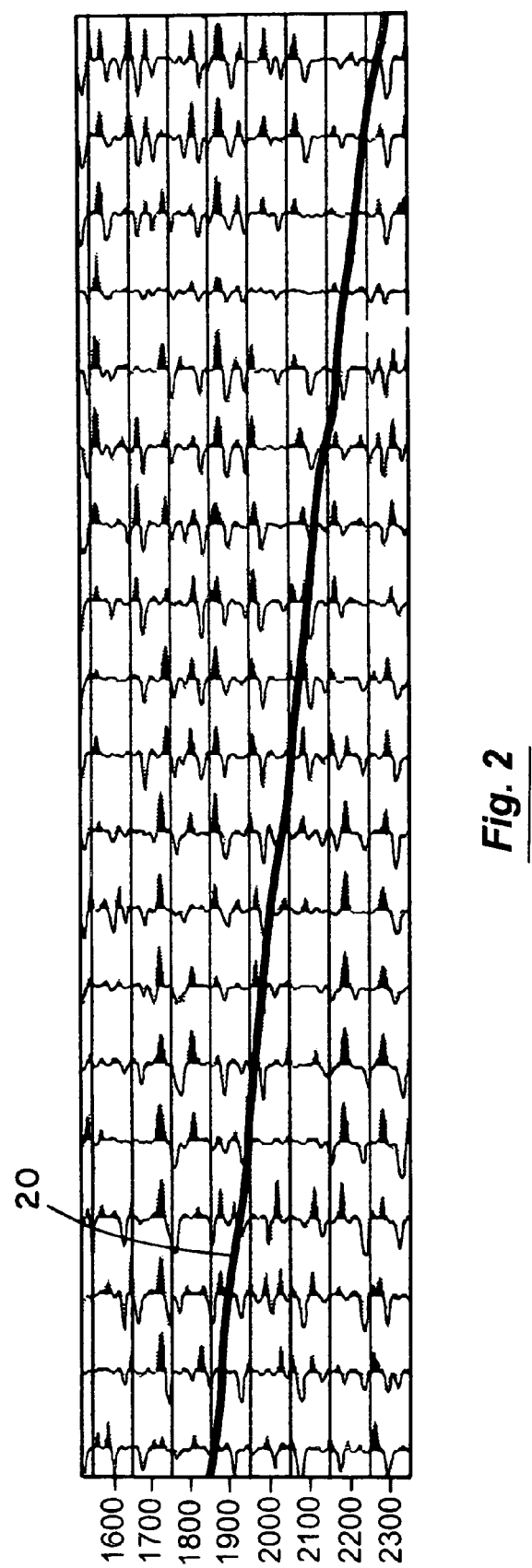
FIG. 2 is a diagram showing an example of the seismic line extracted along a deviated well.

Extract a Window in Time Along/Around the Well Path. Given the x-y coordinates of the seismic data (2D section or 3D volume) extracted along (in 2D) or around (in 3D) the well path and the 3D well path with the vertical axis in time, one can determine the time at which the well path crosses or is closest to the bin centers of the seismic traces intersected by (3D case) or closest to (2D case) the well path. A time window for each trace crossed by the well path (or within a specified distance from the well path) is defined by taking the time at which the well path crosses or is closest to the bin centers of the seismic traces intersected by (3D case) or closest to (2D case) the well path and adding a user-specified amount of time above and below the time at which the well path crosses or is closest to the bin centers of the seismic traces intersected by (3D case) or closest to (2D case) the well path. Seismic data values outside this time window are deleted. In the 3D case, the time window defined at the trace crossed by the well path is applied to the adjacent traces in the 3D well path volume. FIG. 2 shows an example of the seismic line extracted along a deviated well. The calculated position of the well bore 10 is shown along the seismic line.

Combine the Extracted Window of Seismic Data, Taking Dip into Account if Necessary. Once the corridor of seismic data samples has been extracted around the well path, the next step is to combine these samples to obtain a single composite seismic trace. This combination, or stacking as it is referred to in the seismic industry, of seismic samples can take the dip and lateral continuity of the seismic reflectors as well as the inclination of the well bore into account in the stacking process.

The lateral continuity of the reflectors can be taken into account in the stacking process by specifying the number of traces, or alternatively, the maximum radial distance, away from the sample on the well path to be included in the stacking. In areas of high lateral continuity of the seismic reflectors, a large number of traces (corresponding to a large radial distance) away from the sample at the well bore can be included in the stack. Conversely, in areas of low lateral continuity of the seismic reflectors, a small number of traces (corresponding to a small radial distance) away from the sample at the well bore should be included in the stack. A visual examination of the seismic data along the well path allows the user to qualitatively determine the number of traces (or radial distance) appropriate for use in stacking.

The dip of the seismic reflectors and the inclination of the well bore can be taken into account by using overlapping vertical windows in the stacking process. In the case of flat-lying reflectors (no dip), one window is sufficient. The user may vary the number of samples contained within a window from all samples (i.e., one window) to one sample (i.e., the number of windows equals the number of samples). The windows may be defined in several ways, for example:

- a constant width in time (constant number of samples per window), with the windows located on the traces automatically
- a varying time thickness, with the window boundaries defined by seismic time horizons
- a varying time thickness, with the window boundaries defined by depths in the well (known as well markers or formation tops) converted to time
- a varying time thickness, with the window boundaries located manually by the user Within each time window, the trace that contains the seismic sample that intersects the well bore path in the middle of the stacking window is considered to be the reference trace. The other traces selected to include in the stack within the window are aligned to optimize the match with the reference trace. This alignment can be accomplished by one of several methods, for example:

- cross-correlating each trace to be included in the stack with the reference trace in the stack, and applying the time shift defined by the time of the maximum value of the cross-correlation to the trace before stacking with the reference trace
- performing a number of dip stacks with user-defined dip (and azimuth in 3D) ranges, and selecting the optimum dip stack (either by visual inspection done by the user or by automatic detection by selecting the stack that produces that maximum or maximum average envelope value by applying a user-defined dip (in milliseconds per distance unit)

Figure 3:
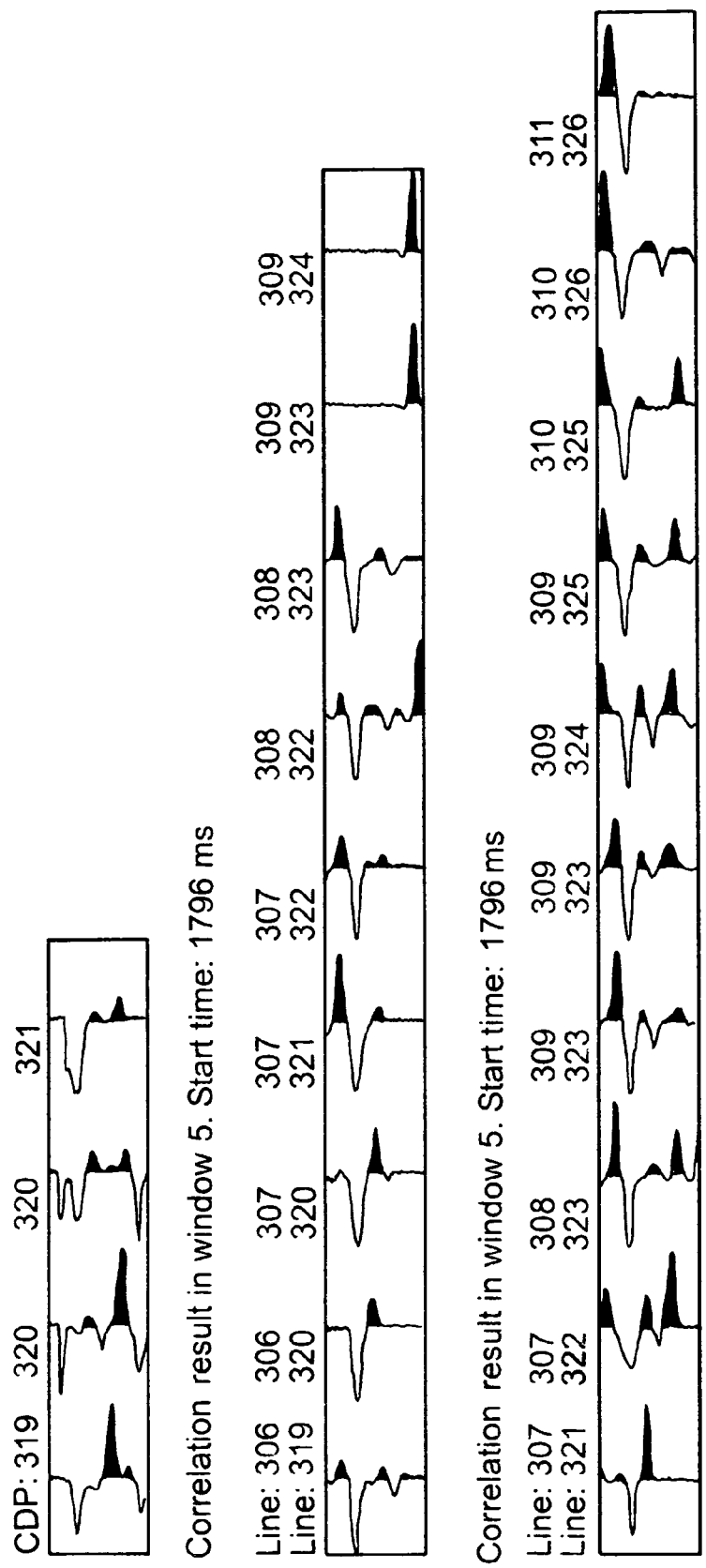
FIG. 3 is a diagram showing time windows used to create a seismic trace along the well path.

FIG. 3 shows an example of the time windows used to create a seismic trace along the well path.

Figure 4:
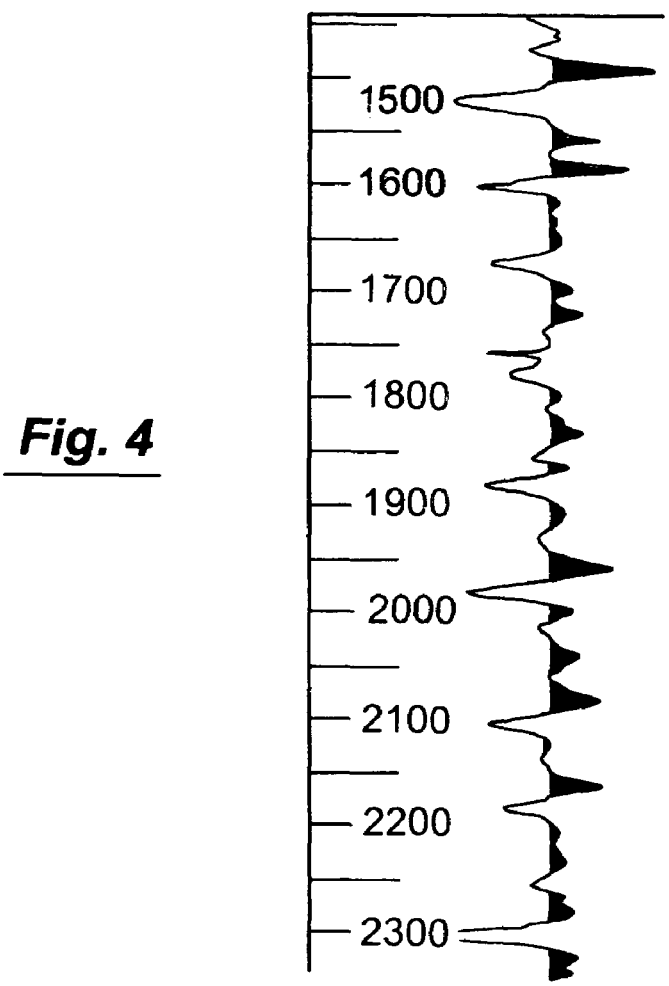
FIG. 4 is a diagram showing an example of a seismic trace along the well bore computed from the individual correlation windows.

The stacking process can be the normal seismic stack (for each time value, the sum of the samples at that time divided by the number of samples or the square root of the number of samples), or other modified stacking methods such as an alpha-trimmed mean stack or a median stack. The result of the stacking process is one seismic trace corresponding to the seismic data along the well path of the deviated well. FIG. 4 shows an example of a seismic trace along the well bore computed from the individual correlation windows.

Figure 6:
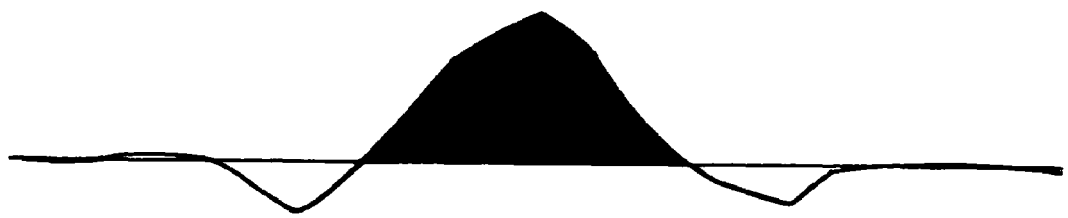
FIG. 6 is a diagram of a seismic wavelet extracted from the seismic trace along the well bore.
Figure 5:
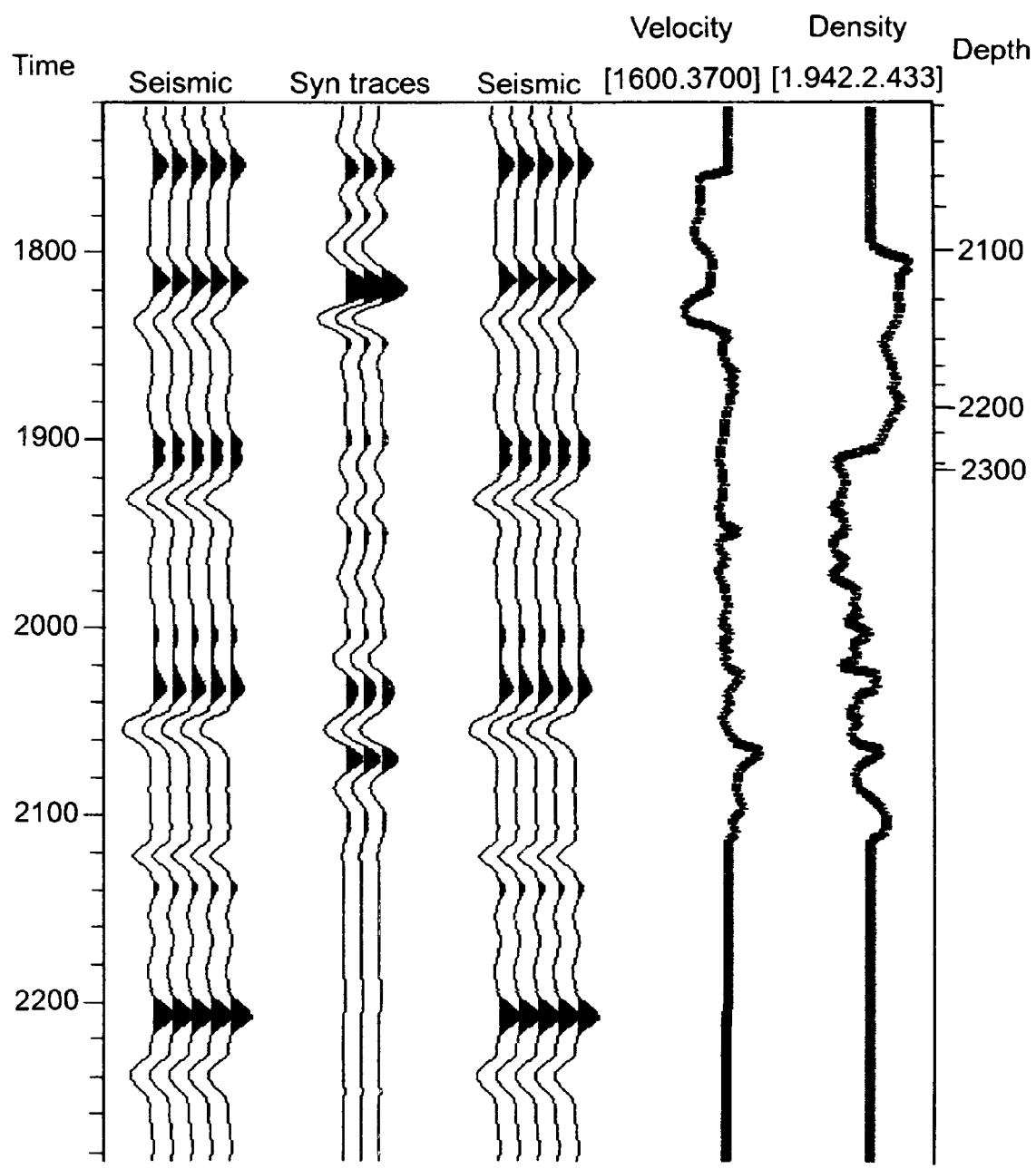
FIG. 5 is a diagram showing the correlation of synthetic seismic traces derived from sonic and density logs with the seismic trace calculated along the well bore using the present method.

Wavelet Extraction. Once the deviated well trace is produced using the procedure described above, any method of wavelet extraction using a single seismic trace or a single seismic trace and sonic and density log data may be employed to calculate the seismic wavelet. Examples of possible wavelet extraction methods include: (a) extraction of the amplitude spectrum of the wavelet from the frequency spectrum of the seismic data, with the phase spectra set to a constant value by the user; (b) complex division in the frequency domain of the seismic trace by the reflection coefficient series; (c) windowed and tapered cross-correlation of the reflection coefficient series with the seismic trace; (d) division of the cross-spectra of the seismic trace and the reflection coefficient series by the product of the power spectra of the seismic trace and the reflection coefficient series; (e) polynomial algebra; and (f) simulated annealing. FIG. 5 is a diagram showing the correlation of synthetic seismic traces derived from sonic and density logs with the seismic trace calculated along the well bore using the present method. FIG. 6 is a diagram of a seismic wavelet extracted from the seismic trace along the well bore.

The method described above performs the generation of a composite seismic trace along the borehole (in 3D) or close to the borehole (in 2D). This composite trace can be constructed taking dip and lateral continuity into account in the compositing (stacking) process. Once this single composite trace is generated, the composite trace and the true vertical depth log data are used to extract a seismic wavelet, employing any of a variety of wavelet extraction techniques. This should be useful in seismic processing, inversion, spectral decomposition, interpretation, and any other process or procedure where extracting or knowing the seismic wavelet is useful and deviated well data are available. This is of obvious benefit in areas where most of the wells are deviated, such as in offshore areas and areas onshore where many wells are drilled from a single surface location.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A method for obtaining a seismic wavelet using seismic data in a deviated well, said method comprising the following steps programmed on a computer:
    extracting seismic data along the well path;
    calculating the well path in the time domain;
    extracting at least one window of seismic data in the time domain along the well path in the time domain;
    combining the extracted window of seismic data to obtain a composite seismic trace; and
    extracting a seismic wavelet using the composite seismic trace.

2. The method of claim 1 wherein the step of combining the extracted window of seismic data further comprises selecting the number of traces away from the well path to be included in the composite seismic trace based on the lateral continuity of seismic reflectors in the strata surrounding the well.

3. The method of claim 1 wherein the step of combining the extracted window of seismic data further comprises including only those seismic traces within a selected radial distance of the well path based on the lateral continuity of seismic reflectors in the strata surrounding the well.

4. The method of claim 1 wherein a plurality of windows of seismic data are extracted to account for inclination of the well and dip of seismic reflectors in the strata surrounding the well.

5. The method of claim 4 wherein the plurality of windows of seismic data comprise overlapping vertical windows.

6. The method of claim 4 further comprising:
    selecting a reference seismic trace within each window; and
    aligning the remaining seismic traces within each window with the reference seismic trace.

7. A method for obtaining a seismic wavelet using seismic data in a deviated well, said method comprising the following steps programmed on a computer:
    extracting seismic data along the well path;
    calculating the well path in the time domain;
    extracting at least one window of seismic data in the time domain along the well path in the time domain;
    combining those seismic traces in the extracted window of seismic data within a selected radial distance of the well path based on the lateral continuity of seismic reflectors in the strata surrounding the well to obtain a composite seismic trace; and
    extracting a seismic wavelet using the composite seismic trace.

8. The method of claim 7 wherein a plurality of windows of seismic data are extracted to account for inclination of the well and dip of seismic reflectors in the strata surrounding the well.

9. The method of claim 8 wherein the plurality of windows of seismic data comprise overlapping vertical windows.

10. The method of claim 8 further comprising:
    selecting a reference seismic trace within each window; and
    aligning the remaining seismic traces within each window with the reference seismic trace.

11. A method for obtaining a seismic wavelet using seismic data in a deviated well, said method comprising the following steps programmed on a computer:
    extracting seismic data along the well path;
    calculating the well path in the time domain;
    extracting a plurality of windows of seismic data in the time domain along the well path in the time domain, wherein the windows are selected to account for the inclination of the well and the dip of seismic reflectors in the strata surrounding the well;
    selecting a reference seismic trace within each window that intersects the well path;
    aligning the remaining seismic traces within each window with the reference seismic trace;
    combining the aligned seismic traces to obtain a composite seismic trace; and
    extracting a seismic wavelet using the composite seismic trace.

12. The method of claim 11 wherein the windows of seismic data comprise overlapping vertical windows.

13. The method of claim 11 wherein the step of combining the aligned seismic traces further comprises selecting the number of traces away from the well path to be included in the composite seismic trace based on the lateral continuity of seismic reflectors in the strata surrounding the well.

14. The method of claim 11 wherein the step of combining the aligned seismic traces further comprises including only those seismic traces within a selected radial distance of the well path based on the lateral continuity of seismic reflectors in the strata surrounding the well.

* * * * *